United States Patent
Vakil et al.

(10) Patent No.: US 8,107,956 B2
(45) Date of Patent: Jan. 31, 2012

(54) PROVIDING OVER-THE-TOP SERVICES ON FEMTO CELLS OF AN IP EDGE CONVERGENCE SERVER SYSTEM

(75) Inventors: Faramak Vakil, Long Grove, IL (US); Dragan M. Boscovic, South Barrington, IL (US); Samuel D. Glazer, New York, NY (US); Surender Kumar, Palatine, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 445 days.

(21) Appl. No.: 12/345,752

(22) Filed: Dec. 30, 2008

(65) Prior Publication Data
US 2010/0167732 A1 Jul. 1, 2010

(51) Int. Cl.
*H04W 4/00* (2009.01)

(52) U.S. Cl. ............ 455/435.1; 455/422.1; 370/352; 370/356

(58) Field of Classification Search ............ None
See application file for complete search history.

(56) References Cited

U.S. PATENT DOCUMENTS

| | | | |
|---|---|---|---|
| 5,459,727 A | 10/1995 | Vannucci | |
| 5,513,184 A | 4/1996 | Vannucci | |
| 6,104,513 A | 8/2000 | Bloom | |
| 6,393,106 B1 | 5/2002 | Cannon et al. | |
| 6,667,759 B2 | 12/2003 | Gerszberg et al. | |
| 7,042,871 B2 | 5/2006 | Gallant et al. | |
| 7,127,045 B1 | 10/2006 | Yoon et al. | |
| 7,162,013 B2 | 1/2007 | Gavette et al. | |
| 7,277,410 B2 | 10/2007 | Horneman | |
| 7,417,982 B2 | 8/2008 | Jain et al. | |
| 2001/0036834 A1 | 11/2001 | Das et al. | |
| 2004/0131025 A1 | 7/2004 | Dohler et al. | |
| 2004/0139228 A1 | 7/2004 | Takeda et al. | |
| 2005/0073574 A1 | 4/2005 | Krisbergh et al. | |
| 2005/0180553 A1 | 8/2005 | Moore | |
| 2005/0201304 A1 | 9/2005 | Olshansky | |
| 2006/0136557 A1 | 6/2006 | Schaedler et al. | |
| 2006/0264213 A1* | 11/2006 | Thompson | ........ 455/433 |
| 2006/0274741 A1 | 12/2006 | Wing et al. | |

(Continued)

FOREIGN PATENT DOCUMENTS
EP  1126738 B1  7/2007

OTHER PUBLICATIONS

"Femtocell", Wikipedia, accessed at http://en.wikipedia.org/wiki/Femto_cell on Feb. 6, 2008.

(Continued)

Primary Examiner — Ajit Patel
(74) Attorney, Agent, or Firm — Stewart M. Wiener

(57) ABSTRACT

A method is provided for enabling an over the top (OTT) service over a broadband network. The method includes receiving a registration request from a mobile User Equipment (UE) over a femto cell to register with a cellular operator of a cellular network. The registration request is forwarded to an authentication, authorization, and accounting (AAA) server associated with the cellular operator to register the mobile UE therewith. A rendition of the registration request is forwarded to an AAA server associated with a broadband operator of a broadband network to register the mobile UE therewith.

20 Claims, 5 Drawing Sheets

THE ARCHITECTURE OF THE ECONS NETWORK

U.S. PATENT DOCUMENTS

| | | | |
|---|---|---|---|
| 2007/0002775 A1 | 1/2007 | Belling | |
| 2007/0015536 A1* | 1/2007 | LaBauve et al. | 455/552.1 |
| 2007/0036143 A1 | 2/2007 | Alt et al. | |
| 2007/0043829 A1 | 2/2007 | Dua | |
| 2007/0058537 A1 | 3/2007 | Belling | |
| 2007/0071221 A1 | 3/2007 | Allen et al. | |
| 2007/0078986 A1 | 4/2007 | Ethier et al. | |
| 2007/0081518 A1 | 4/2007 | Jain et al. | |
| 2007/0088836 A1 | 4/2007 | Tai et al. | |
| 2007/0097983 A1 | 5/2007 | Nylander et al. | |
| 2007/0171893 A1* | 7/2007 | Xu et al. | 370/352 |
| 2007/0183427 A1 | 8/2007 | Nylander et al. | |
| 2007/0189311 A1 | 8/2007 | Kim et al. | |
| 2007/0195755 A1 | 8/2007 | Li et al. | |
| 2007/0195805 A1 | 8/2007 | Lindgren | |
| 2007/0211695 A1 | 9/2007 | Shi et al. | |
| 2007/0254620 A1 | 11/2007 | Lindqvist et al. | |
| 2007/0254634 A1 | 11/2007 | Costa-Requena et al. | |
| 2007/0270152 A1 | 11/2007 | Nylander et al. | |
| 2007/0294411 A1 | 12/2007 | Hakkarainen | |
| 2008/0045214 A1 | 2/2008 | Wen et al. | |
| 2008/0056465 A1 | 3/2008 | Ruckart | |
| 2008/0075262 A1 | 3/2008 | Wood et al. | |
| 2008/0159488 A1 | 7/2008 | Raja | |
| 2008/0212594 A1 | 9/2008 | Shaikh et al. | |
| 2008/0244610 A1 | 10/2008 | Zhang et al. | |
| 2008/0259909 A1 | 10/2008 | Runeson et al. | |
| 2008/0270618 A1 | 10/2008 | Rosenberg | |
| 2009/0170524 A1* | 7/2009 | Yoshizawa | 455/453 |
| 2009/0190518 A1* | 7/2009 | Kim et al. | 370/312 |
| 2009/0217048 A1* | 8/2009 | Smith | 713/176 |
| 2009/0245133 A1* | 10/2009 | Gupta et al. | 370/254 |
| 2009/0296635 A1 | 12/2009 | Hui et al. | |
| 2010/0009664 A1* | 1/2010 | Hossain | 455/415 |
| 2010/0027694 A1 | 2/2010 | Touboul et al. | |
| 2010/0040024 A1* | 2/2010 | Wu | 370/331 |
| 2010/0093354 A1 | 4/2010 | Agashe et al. | |
| 2010/0113016 A1* | 5/2010 | Gayde et al. | 455/433 |
| 2010/0113036 A1 | 5/2010 | Cho et al. | |
| 2010/0159960 A1 | 6/2010 | Chou et al. | |
| 2010/0197311 A1 | 8/2010 | Walldeen et al. | |
| 2010/0241756 A1* | 9/2010 | Lee et al. | 709/229 |
| 2011/0019614 A1* | 1/2011 | O'Neill et al. | 370/328 |
| 2011/0063997 A1* | 3/2011 | Gras et al. | 370/254 |

OTHER PUBLICATIONS

"Universal Mobile Telecommunications System", Wikipedia, accessed at http://en.wikipedia.org/wiki/UMTS on Feb. 6, 2008.
"Session Initiation Protocol", Wikipedia, accessed at http://en.wikipedia.org/wiki/Session_Initiation_Protocol on Feb. 6, 2008.
"GSM", Wikipedia, accessed at http://en.wikipedia.org/wiki/GSM on Feb. 6, 2008.
"UMA: The 3GPP Standard for Femtocell-to-Core Network Connectivity", A Kineto White Paper, Aug. 2007.
Greene et al., "Over the Top Services", Article for Pipeline Magazine, Dec. 2007.
"Flooding Algorithm" Wikipedia, accessed at http://en.wikipedia.org/wiki/Flooding_algorithm on May 19, 2008.

* cited by examiner

THE ARCHITECTURE OF THE ECONS NETWORK

PROVIDING OVER-THE-TOP SERVICES ON FEMTO CELLS OF AN IP EDGE CONVERGENCE SERVER SYSTEM

FIELD OF THE INVENTION

The invention relates to a system and method for supporting over the top (OTT) services on a wireless and wireline communication system and in particular, on a communication system supporting Internet Protocol (IP) multimedia services.

BACKGROUND OF THE INVENTION

Due to users' increasing demand for perpetual and ubiquitous access to the Internet, the end-to-end wireless/wireline communications network is gradually migrating towards a flexible wireless and wireline IP infrastructure that supports heterogeneous multimedia (e.g., voice, video, data and the like) services in an economical manner. Thus, the Third Generation Partnership Project (3GPP) has been developing the specifications and architecture of an IP multimedia subsystem (IMS) that augments the existing circuit switched & 2G/3G wireless systems and expedites their gradual migration to an all IP infrastructure. IMS is built upon the open standard IP protocols defined by the IETF (Internet Engineering Task Force). It aims to serve as a ubiquitous IP service control and delivery platform for supporting all current services that existing circuit switched networks and the Internet offer as well as providing a vehicle for development and deployment of new services and applications in future.

The IMS technology defined by the 3GPP to provide IP Multimedia services over 3G mobile communication networks is set forth in 3GPP TS 23.228, Release 7 and TS 24.229 Release 8, which are hereby incorporated by reference in their entirety. IMS provides key features to enrich the end-user person-to-person communication experience through the integration and interaction of services. IMS allows new rich person-to-person (client-to-client) as well as person-to-content (client-to-server) communications over an IP-based network. The IMS makes use of the Session Initiation Protocol (SIP) to set up and control calls or sessions between user terminals (or user terminals and web servers). SIP is an example of an application level signaling protocol used by an initiating device to locate another device in order to establish a communication session. The Session Description Protocol (SDP), carried by SIP signaling messages, is used to describe and negotiate the media components of the session. Other protocols are used for media transmission and control, such as Real-time Transport Protocol and Real-time Transport Control Protocol (RTP/RTCP), Message Session Relay Protocol (MSRP), Hyper Text Transfer Protocol (HTTP).

FIG. 1(a) depicts the simplified layered architecture of a standard IMS, showing the transport, control, & applications layers of the network. The transport layer transfers bits and packets of information across the end-to-end platform, which comprises a set of heterogeneous networks including, but not limited, to the existing public switched telephone network-(PSTN), the Internet, a 2G/3G cellular network, a WLAN (wireless local area networks), and so on.

The IMS control layer is responsible for setting up sessions and allocating necessary resources for supporting users' services and applications. The IMS control layer primarily comprises the home subscriber server (HSS), call server control function (CSCF), and a set of edge controllers. The HSS, which stores and manages user subscription data, includes the IMS authentication, authorization, & accounting—(AAA) server as well as its master user profile database. Essentially, the HSS provides the functions of a master AAA and its profile database, very much equivalent to those of the home location registrar (HLR) and the Authentication Center (AuC) in GSM networks. The CSCF entity, which implements the session initiation protocol (SIP), is the session management and call control engine of the IMS. A CSCF also acts as a SIP registrar receiving registration information (e.g., public identity, private identity, contact, etc.), and stores them in the HSS that serves as a master AAA and user profile server. The IMS edge controllers are entities that facilitate the interworking of the IMS subnet with the existing wireless and wireline networks.

The IMS application layer includes a set of application servers (ASs) where an AS hosts and executes one or more IMS services/applications. The CSCF uses SIP to interact with ASs and vice-versa.

The 3GPP has adopted a highly centralized architecture in the development of the IMS specifications. It uses centralized application servers to support the various services/applications and a centralized platform to provide control layer functions (e.g., presence, AAA, and mobility management) necessary for running applications or offering services. In addition, centralized call controllers are used for session origination/modification/termination, quality of service control, and collecting charging data records. A key strength of IMS, its network-centric centralized architecture, is also the source of its main shortcomings. On the one hand, it allows the IMS to serve as a platform for efficiently supporting many services. On the other hand, it makes the introduction of IMS into legacy networks quite complex and costly. Moreover, the scalability, resiliency, and management flexibility of IMS are suboptimal.

To alleviate the shortcomings of the centralized IMS approach while supporting identical or at least similar services, U.S. patent application Ser. No. 11/688,965 and U.S. patent application Ser. No. 11/668,970 set forth a distributed architecture comprising an interconnected set of Edge Convergence Server (ECONS) customer premises equipments (CPEs). Hereafter, the said distributed architecture is referred to as ECONS architecture, the CPEs are referred to as ECONS CPEs, and the resulting IP multimedia communication network is referred to as ECONS system or ECONS network, interchangeably.

The tenet of ECONS architecture is to move most of the functions of the IMS application and control layers, as appropriate, into ECONS CPEs, which are distributed across the subscribers' homes and premises. Such a distributed architecture can reduce the cost of introducing IMS into legacy networks and improve the scalability, flexibility and resiliency of the overall system.

FIG. 1(b) depicts the simplified layered architecture of the ECONS approach in which many of the functions of the application layer and the control layer are moved to the ECONS CPEs at the user premises. The ECONS architecture is designed to provide an operator with a decentralized, low cost, scalable solution to deliver voice and multimedia services to its customers. Instead of relying on a costly and complex centralized core network, the ECONS architecture pushes the intelligence to the edge of the network by deploying ECONS CPEs on the subscriber's premises. The ECONS CPE provides session control functions and application servers, while the core network is limited to providing AAA services for the CPEs, and gateways to other networks. The functional ECONS CPE may be embodied in a residential gateway, set top box, media center or the like.

The following description sets forth some of the main characteristics of the ECONS architecture. First, the ECONS is a distributed networking system. Instead of relying on a centralized core network, the main functionality of the ECONS system is provided by the ECONS CPE. The ECONS CPEs provide user registration and session management, authentication, media gateway, application servers and call control functions for user equipments (UEs) such as cell phones and the like. The core network provides authentication for CPEs and interworking functions with other networks. Second, the ECONS architecture is scalable. As the number of subscribers increases, so does the number of deployed CPEs, thus growing as required. Third, the ECONS architecture can operate in a peer to peer as well as client server manner. Whenever possible, the communication happens at the edge of the network with minimal intervention by the network core. Signaling and media are transferred directly between CPEs, without being relayed by the core network. Fourth, the ECONS architecture provides advanced functions to its users with minimal involvement of its core network. In particular, several UEs can be associated with the same CPE. Fifth, as in IMS, the session management and control in ECONS system is performed using the SIP protocol. An ECONS system can interoperate with other SIP networks, including IMS.

In summary, an ECONS system is a distributed IP-centric control and signaling platform comprising a set of CPEs residing at the subscribers' premises which provides voice, video, data, and multimedia services to fixed and mobile subscribers. Each ECONS CPE comprises presence, location, session management, resource management, AAA, NAT traversal, CPE management enablers as well as the standard TCP/IP stack, and possibly a DSL/Cable modem for access to the Internet. The CPE is controlled and possibly owned by the operator rather than the subscriber.

FIG. 2 depicts the functional architecture of an ECONS network 200. It should be emphasized that in this implementation the circuit switched network 220 and the broadband IP network 230 both belong to and are operated by the same operator. The ECONS network comprises a set of ECONS CPEs 210 connected to the operator's core network. The ECONS core network comprises the operator's circuit switched and broadband IP networks 220 and 230. An individual ECONS CPE 210 may be connected to the operator's broadband IP network 230 or to both its broadband IP network 230 and its circuit switched network 220. Although the ECONS architecture envisions moving most of the control and application layers functions of IMS into ECONS CPEs, it still maintains in the core network a set of common functions that operators deem essential to proper operation and security of the network (e.g., AAA server, NAT traversal, etc.).

More specifically, the functional entities in the ECONS network are the ECONS CPE 210 and the operator's control platform 240 in its core network. The operator's control platform of the ECONS core network includes a rendezvous server 242, a NAT traversal server 244, a DNS server 246, a SIP proxy 248, a VoIP gateway 250 and an authentication, authorization, and an accounting (AAA) server 252.

The ECONS CPE 210 is the central entity of the system 200. It comprises a SIP-based session manager, a policy repository, and application servers such as a presence server, web server, etc. The session manager of the ECONS CPE may control every communication flow initiated or received by the UE 260. It may add or drop call/session legs, route sessions to any endpoint, and seamlessly move a session to any end points. The ECONS CPE 210 provides control over all audio and video sessions of the UEs 260. It is responsible for routing SIP signaling to other ECONS CPEs as well as to other SIP devices. It also provides a local proxy/registrar for SIP based UEs, and the gateway functionality for POTS (plain old telephone service) equipments. It may also include some application servers, such as a presence server. It is important to note that the ECONS CPE 210 is installed in the user's home network. It may include a broadband modem, in which case it is connected directly to the broadband network. It can also be connected through an Ethernet link to an external broadband modem, which may implement a network address translator (NAT) 270. In this case the ECONS CPE 210 provides the necessary mechanisms for NAT traversal for SIP signaling and media.

The rendezvous server 242 of the ECONS core network provides a simple way for a CPE to reach any other CPE in the system. Every ECONS CPE 210 maintains an active connection with the rendezvous server 242. This connection can be used to send a short message to any other ECONS CPE. It is mainly used for NAT traversal. When two ECONS CPEs 210 want to establish a SIP session, they determine their public IP addresses using STUN (Simple Traversal of UDP thru NATs) protocol, and then they send their public addresses to each other through the rendezvous server 242. After these addresses have been exchanged the rest of the communication is done directly between the CPEs without the intervention of any other node.

The STUN server 244 is the NAT Traversal that supports the STUN protocol and the relay usage of that protocol The STUN protocol is used by a node behind a NAT (which in the case of ECONS is an ECONS CPE) to find its own public address, determine the NAT type and the Internet side port associated by the NAT with a particular local port. The STUN server 244 also supports the relay usage. In the relay usage the server allocates a public IP address and port that the client can use for communications through the NAT. Note that in the relay usage data has to be relayed through the core of the network, which is, of course, less efficient. The detailed specifications of STUN are presented in RFC 3489.

The DNS server 246 of the provider's control platform 240 includes entries identifying the SIP servers for the provider's domain, an ENUM database, and the list of available STUN servers. Note that "ENUM" is a protocol that resolves fully qualified telephone numbers to fully qualified domain name addresses using a DNS-based architecture. The DNS specifications are set forth in RFC 1034 and RFC 1035.

The SIP proxy 248 is used to route SIP signaling between external networks and the ECONS CPEs. The SIP proxy 248 can receive SIP requests from non-ECONS SIP devices and route them to the appropriate ECONS CPE. The SIP specifications are set forth in RFC 3261.

The VoIP gateway 250 provides signaling and media gateway functionalities to interwork the circuit switched network with the ECONS network.

The AAA server 252 provides AAA services for the ECONS CPEs. It comprises an ECONS profile server as well as AAA engine that authenticates the CPEs. It also stores the billing records resulting from calls to the circuit switched domain. In principle, the AAA server 252 functionality is equivalent to those of a HSS in a centralized IMS.

One class of services that has recently begun to be provided to customers is sometimes referred to as over-the-top (OTT) services. Such services are carried over a network that is operated by a carrier service provider. However, the carrier service provider may or may not be involved in the planning, selling or provisioning of the OTT services being carried over their network.

Cellular operators deploy low power base stations at subscribers' premises to improve their indoor cellular coverage. These base stations are often referred to as femto cells in the cellular industry generally and as Home NodeBs in the 3GPP community in particular. These femto cells are attached to the cellular operator's core network and its centralized IMS services. Three options are currently considered for femto cell connectivity to the core network: Iu-b over IP, RAN Gateway, and SIP/IMS. First, The Iu-b over IP option uses the existing 3GPP Iu-b interface to leverage the cellular operators' 3G Radio Node Controllers (RNCs) to support these femto cells, through a remote gateway along with the 3G NodeBs (i.e., 3G BTSs). Note that the Iu-b interface is primarily proposed for connection of 3G NodeBs with 3G RNCs. Second, the RAN Gateway approach uses a network controller residing between the cellular operator's core network and its IP access network to connect the femto cells to the cellular core network. Third, the SIP/IMS solution proposes to use SIP between femto cells and the IMS core of the cellular operator.

With standard IMS, if the cellular operator is also the subscriber's Internet Service Provider (ISP), it may also utilize the femto cell to provide OTT services such as VoIP, SMS and the like to a mobile subscriber using her/his broadband access services, besides improving the indoor coverage at the subscriber's premises. In this case the "over the top" service being offered rides on top of the cable or DSL access network via a Cable or DSL modem, which is owned and operated by the cellular operator. A limitation of using standard IMS is that none of the three options described above allows the cellular operator to provide OTT services to a subscriber that does not or cannot use the broadband access services offered by her/his cellular operator. The reason for this is that when a subscriber's user equipment (UE) registers with the cellular network, the SIP REGISTER message is always sent to the AAA of the subscriber's cellular operator. In other words, with conventional IMS, the UE is known to the broadband IP network, if and only if the broadband IP network is also owned by the cellular operator. Otherwise the broadband IP network does not recognize the subscriber's UE, and consequently blocks traffic from the subscriber's UE.

The ECONS architecture overcomes the aforementioned limitation without any impact on the subscriber's UE. It enables the cellular operators to more effectively compete with the broadband service providers, as well as the subscribers to receive services from operators' of their choice. It allows the cellular operator to offer "over the top" services on top of the cable or DSL access network via a Cable or DSL modem, regardless of whether it belongs to and is operated by the cellular operator itself or the subscriber's Internet service provider (ISP) which may be one other than the cellular operator.

Thus, a cellular operator that has already deployed femto cells and an ECONS platform for supporting multimedia services to its subscribers not only improves indoor cellular coverage, but also allows the femto cells to offer OTT services to its subscribers.

SUMMARY OF THE INVENTION

In accordance with one aspect of the invention, a method is provided for enabling an over the top (OTT) service over a broadband network. The method includes receiving a registration request from a mobile User Equipment (UE) over a femto cell to register with a cellular operator of a cellular network. The registration request is forwarded to an authentication, authorization, and accounting (AAA) server associated with the cellular operator to register the mobile UE therewith. A rendition of the registration request is forwarded to an AAA server associated with a broadband operator of a broadband network to register the mobile UE therewith.

In accordance with another aspect of the invention, a Consumer Premises Equipment (CPE) is provided that includes a wireless transceiver for establishing communication with a mobile User Equipment (UE) over a femto cell. The CPE also includes a network interface for establishing communication with a cellular network. The CPE additionally includes a session manager configured to register the mobile UE with a broadband network operated by a broadband operator whenever a request is received from the mobile UE over a femto cell to register with a cellular network operated by a cellular operator different from the broadband operator.

DETAILED DESCRIPTION OF THE INVENTION

As detailed below, a system and method is provided that allows a cellular operator to offer OTT services on femto cells through a subscriber's broadband access network regardless of whether the subscriber receives broadband services from the cellular operator or another operator. In particular, the system and method enables the cellular operator to route mobile-initiated sessions from (and mobile terminated sessions to) a mobile subscriber through the mobile subscriber's broadband access network via his/her (hereinafter "her") DSL or Cable Modem and femto cell. The system and method also allows the subscriber to register her cell phone with its broadband service provider as yet another networked device, similar to a PC or the like. In this way inbound calls to the subscriber's home number are also directed to her cell phone. The system and method can also offer OTT services such as VoIP to cellular subscribers' in such a way that their cell phones can be used in a "cordless phone" fashion whenever accessing this service from their pre-assigned ECONS-enabled femto cells located on their premises.

The following description presents one example of a method and system for providing OTT services on femto cells in which a mobile subscriber subscribes to cellular services of one operator and broadband access services of another operator.

Figure 3:
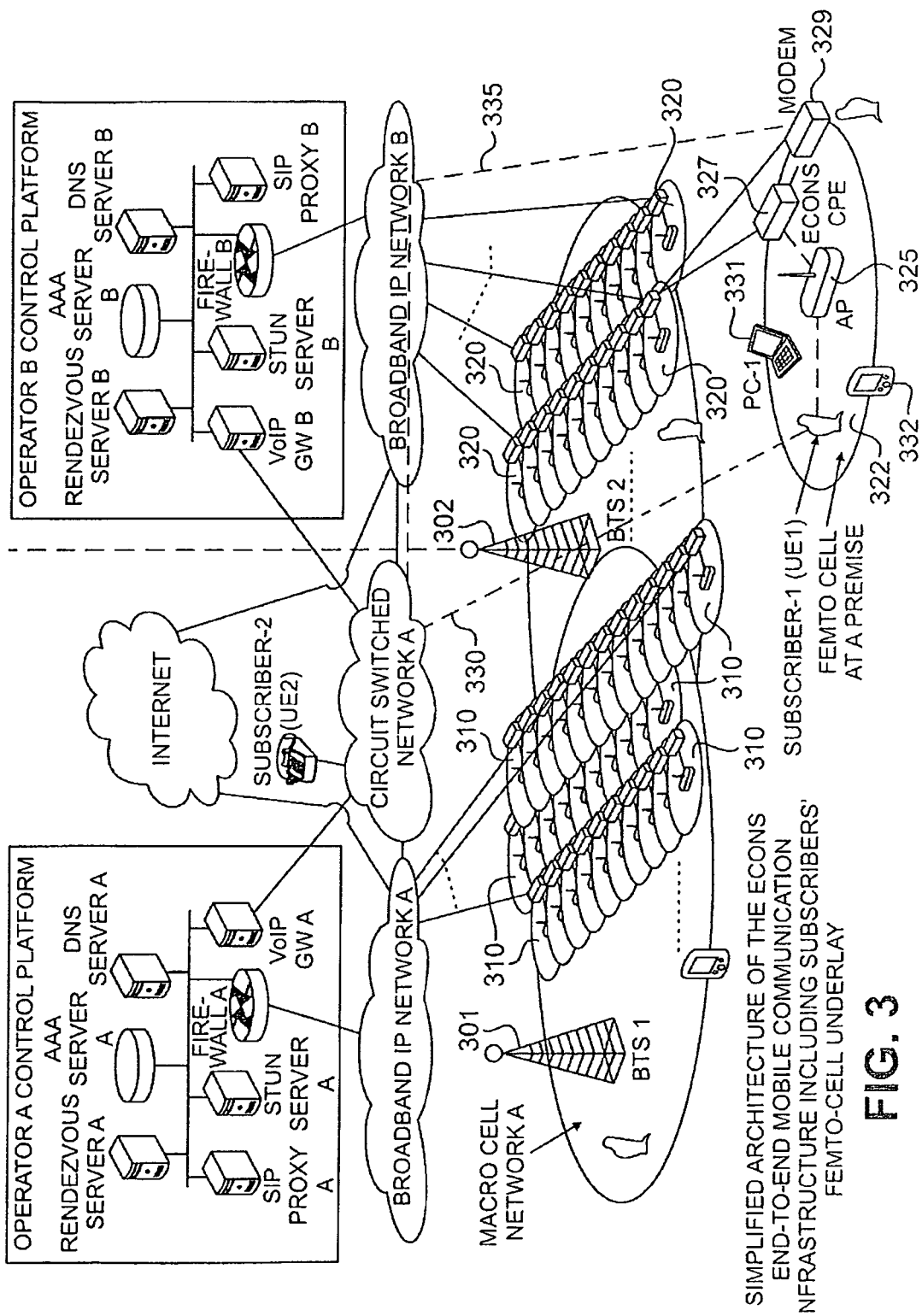
FIG. 3 illustrates the functional architecture of an ECONS system where some subscribers receive their cellular services from a different operator than their broadband services.

FIG. 3 depicts a simplified architecture of an end-to-end ECONS mobile communication infrastructure that includes subscribers' femto cells. This architecture involves two separate operators A and B. Each operator has its own transport infrastructure and control platform. Both operators A and B have deployed ECONS distributed platforms instead of a centralized IMS for providing IMS services. Operator A is an end-to-end wireless/wireline and broadband Internet service provider having its own circuit switched network A, broadband IP network A, and the macro cellular network A. Operator A, which also has a signaling and control platform A, can offer full fledge cellular, telephony and broadband access services to its subscribers over its own networks. Operator B is an Internet service provider (ISP) who owns and operates broadband IP network B. Operator B does not own or operate a circuit switched or cellular infrastructure. Operator B has its own control platform B and offers broadband Internet access and voice over IP (VoIP) services to its subscribers, though its subscribers use the cellular services of operator A in its area of coverage. The broadband IP networks of operators A and B communicate with one another through the Internet. As an aside, it should be noted that operators A & B are presumed to have entered into any necessary bi-lateral business agreements that allow them to provide end-to end services to their subscribers.

In addition to the aforementioned transport infrastructures and control platforms belonging to operators A and B, FIG. 3 also depicts the wireless infrastructure of operator A, including the femto cells that operator A has dispensed to its mobile subscribers. As shown, the macro cellular network of operator A comprises a set of base transceiver stations (BTSs), each covering a macro cell area. In FIG. 3 two such macro cells are depicted, one being served by BTS 301 and the other by BTS 302. The BTSs are most likely attached by wired links to both the circuit switched network A and the broadband IP networks A and B.

A femto cell is an indoor low power cellular base station with a relatively small footprint, which typically resides within the subscriber's premises (e.g., residence). A femto cell usually supports about half dozen mobile devices, and may cover an entire premises or a part of it. Two different sets of femto cells are shown in FIG. 3, femto cells 310 and femto cells 320. All the femto cells 310 and 320 are dispensed by operator A. However, femto cells 310 receive broadband access services from operator A (and hence are connected to broadband network A) while femto cells 320 receive broadband access services from operator B (and hence are connected to broadband network B).

Figure 1:
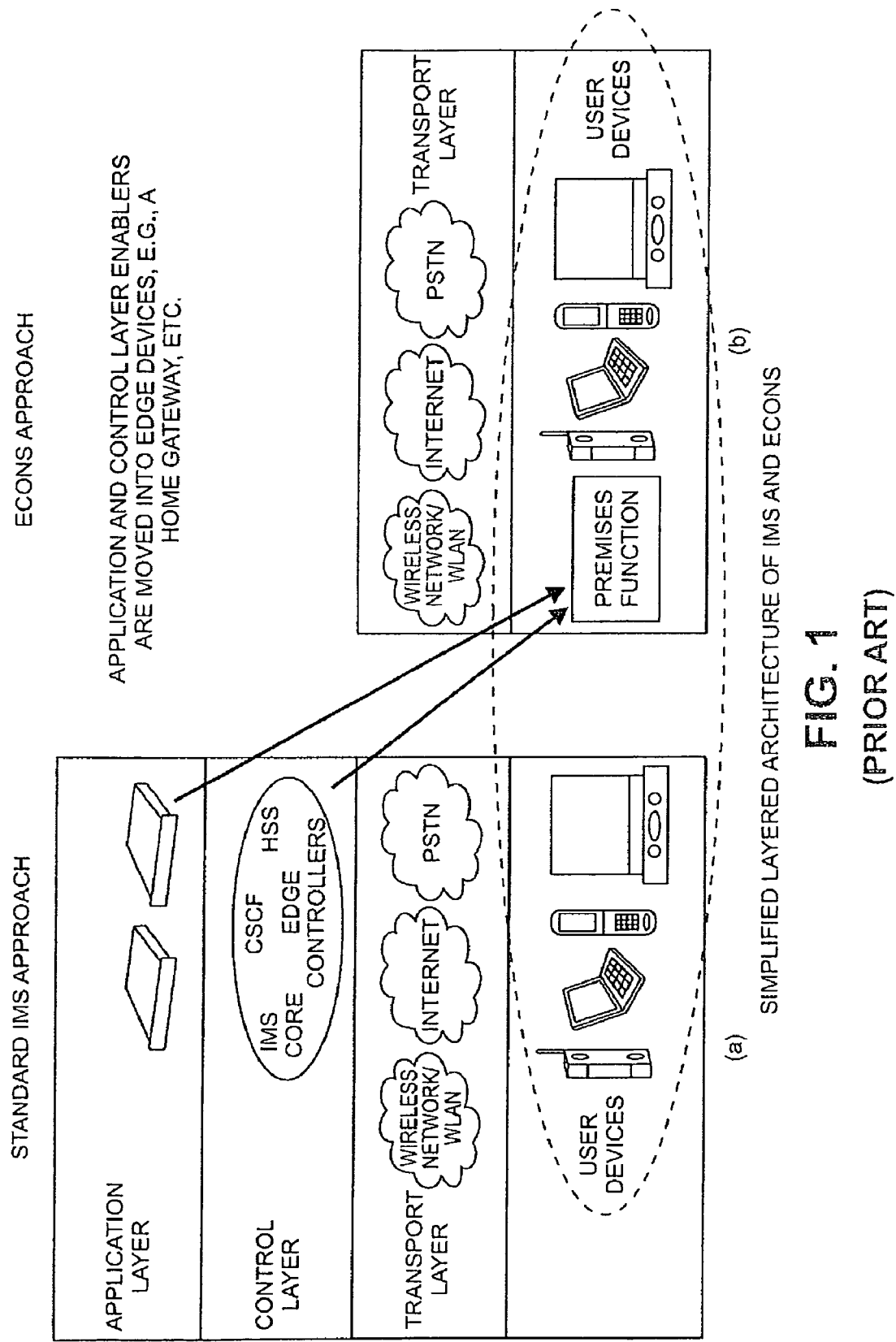
FIG. 1 illustrates the layered architecture of an IMS and an ECONS system.
Figure 2:
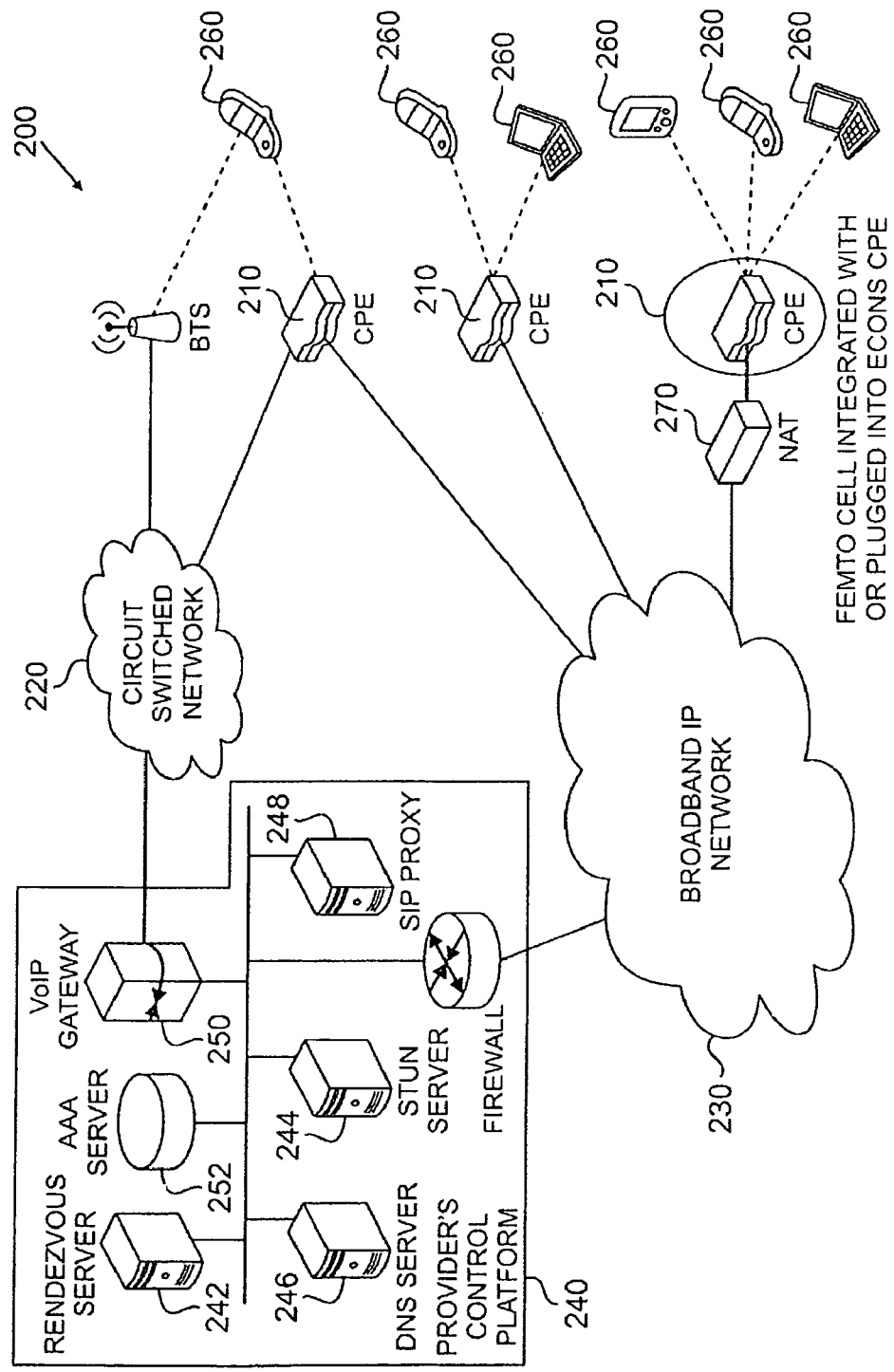
FIG. 2 illustrates the functional architecture of an ECONS system where both broadband IP and circuit switched networks are owned and operated by the same operator.

A detailed view of one of the femto cells 320, denoted 322, is also shown in FIG. 3. It should be noted that femto cells 310 are the same as femto cell 322, except that femto cells 310 are connected to broadband network A instead of broadband network B. The femto cell base station 325 communicates with the subscriber's ECONS CPE 327, which in turn communicates with the broadband network thru operator B's broadband modem 329 such as a DSL or cable modem. When the femto cell is located in the subscriber's premises, the subscriber's wireless devices such as PC 331 and cell phone 332 will generally attach to the femto cell 322 because its indoor coverage and performance is most likely better than those of the macro cellular network of operator A. Thus, all messages from (or to) the subscriber's wireless devices at her/his premises traverse through the femto cell. It should be noted that the femto cell base station and the broadband modem may be integrated with the ECONS CPE (as indicated in FIG. 2) or, alternatively, they may remain as separate devices (as indicated in FIG. 3)

The ECONS CPE 327 serves as the femto cell controller and, during communication sessions, is situated in the route or path to and from the femto cells. When the ECONS CPE is attached to the broadband modem of the broadband service provider, the ECONS CPE can acquire for itself from the broadband network's DHCP server (not shown in FIG. 3) the default gateway, SIP out bound proxy, DNS addresses and an IP address.

Figure 4:
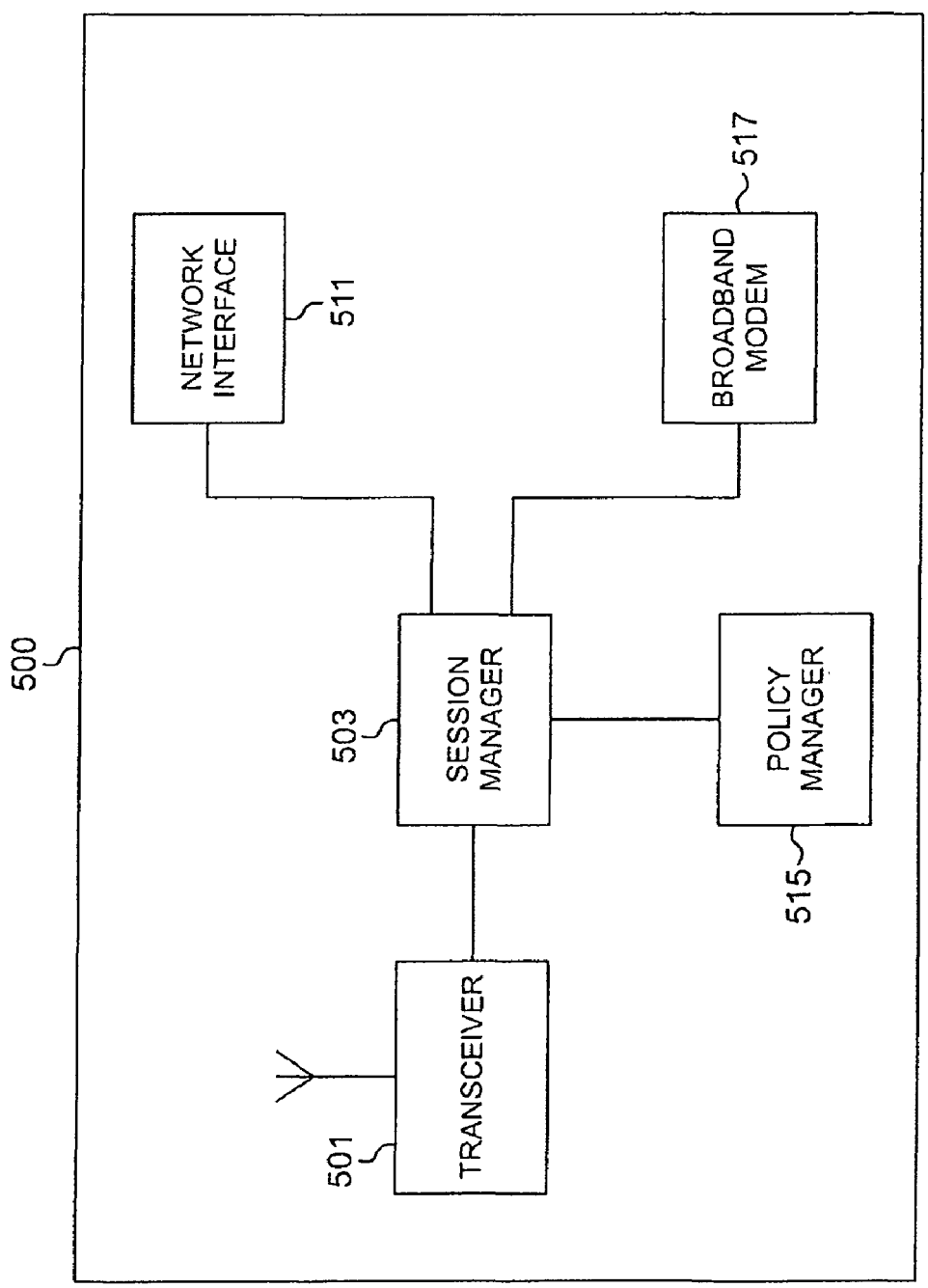
FIG. 4 shows one example of an ECONS CPE.

FIG. 4 shows one example of an ECONS CPE 500. THE CPE 500 includes a transceiver 501, session manager 503, policy manager 515, and a broadband network interface 511.

The transceiver 501 is capable of communicating with the UE-1 over the air interface of the femtocell. The transceiver 501 is coupled to a session manager 503, which may include a SIP server which interfaces a SIP client of the UE-1 to set up new communication sessions, terminate existing sessions, etc. The session manager 503 is furthermore capable of exchanging data of the communication session with the UE-1 using a suitable protocol. A policy manager 515 is provided for storing the required rules for managing session management requests initiated by the UE-1 over the femtocell in order to provide OTT services. The ECONS CPE communicates with the Broadband IP network via its network interface 511. In some cases, the network interface 511 of the ECONS CPE 500 may be a broadband modem.

As FIG. 3 indicates, the cellular operator (i.e., operator A) who has dispensed the femto cells 310 and 320 to its mobile subscribers ends up with a femto cell underlay network that parallels and complements its macro cellular network. By providing over the top services thru this femto cell underlay to subscribers at their premises the operator can unload traffic onto the broadband networks of operator A or B and away from the scarce spectrum of the macro cellular network of operator A.

The operation of the architecture depicted in FIG. 3 can be illustrated by considering two subscribers, Subscriber-1 and Subscriber-2, who wish to communicate with one another. Subscriber-1 (using cell phone UE-1 shown in FIG. 3) is a mobile subscriber of operator A, though she receives her broadband access and wireline VoIP services from operator B over broadband network B. Subscriber-2 (using fixed phone UE-2 shown in FIG. 3) only receives fixed plain old telephone services (POTS) from operator A over circuit-switched network A, which may be a public switched telephone network (PSTN).

Suppose subscriber-1 is at her premises (e.g., her home), when she initiates a session (say a phone call) with subscriber-2. This session can traverse either of the following routes across the end-to-end network. The first route does not use OTT services, while the second does. The first route or path begins with cell phone UE-1 and traverses BTS 2 and circuit switched network A in order to reach fixed phone UE-2. This first route is represented by dashed-dotted line 330 in FIG. 3. The second route or path begins with cell phone UE-1 and traverses the femto cell base station 325, ECONS CPE 327, DSL or Cable Modem 329, broadband IP network B, and circuit switched network A in order to reach fixed Phone UE-2. This second route is represented by the dashed line 335 in FIG. 3. Similarly, the mobile terminated call from subscriber-2 to subscriber-1 at her premises can traverse either of the above two routes, though in the opposite direction. Since the second route allows operator A to provide a communication session over the broadband network B of operator B, the session is being implemented as an OTT service.

The following description sets forth procedures for supporting mobile initiated and mobile terminated calls as OTT services, when the subscriber-1 is at her premises. The prerequisite for providing the aforementioned mobile initiated or mobile terminated call as OTT services is that the cellular operator defines and establishes session management policies/rule for handling these sessions in the policy repository unit of the ECONS CPE. Such policies/rules are as follows. First, the session manager of the ECONS CPE registers UE-1 with operator B. In other words, it forks registration messages initiated from UE-1 and received from the femto cell to the AAA server of operator B to register UE-1 with operator B. Second, the session manager of the ECONS CPE re-directs all non-registration messages received from the femto cell to their destination though the broadband IP network of operator B. With these rules enforced, whenever, UE-1 attempts to register with cellular operator (i.e., operator A) from the subscriber's premises, the session manager automatically registers the UE-1 with operator B as well. Additionally, any outgoing non-registration session management message is routed to the IP broadband network of operator B.

Thus, when subscriber-1 is at her premises, her cell phone is in communication with the subscriber's femto cell 320. Subscriber-1's mobile initiated (or terminated) session is implemented as an OTT service utilizing subscriber-1's broadband IP network, which in this scenario is provided by operator B. This is accomplished as follows. First, upon connection to femto cell 320 at her premises, subscriber-1 sends a registration message from her cell phone (i.e., UE-1) to the cellular operator, operator A, to update her registration, and location. Second, the session manager of the ECONS CPE intercepts this registration message, forks a modified copy to the AAA server of operator B, and forwards the original to AAA server of operator A. Upon the successful registration of UE-1 with both networks, the mobile initiated calls from UE-1 and mobile terminated calls to UE-1 are supported as OTT services. In the case of a mobile initiated call from UE-1 the session manager of the ECONS CPE routes the session set up request through the broadband IP network B, and sets up the call as an OTT service with the call's bearer path traversing the broadband IP network. Similarly, in the case of a mobile terminated call to UE-1 the cellular operator routes the call through broadband IP network B because the UE-1 has already registered with AAA server of the cellular operator from subscriber's residence indicating that UE-1 is attached to the femto cell at her residence/premises.

In one example the session manager of the ECONS CPE is a SIP back to back user agent (B2BUA). A SIP B2BUA is a SIP entity that may add or drop call/session legs, route (or re-route) sessions to any endpoint, and seamlessly move a session to any end points. The following describes the manner in which an ECONS CPE whose session manager is specifically built around a SIP B2BUA supports the aforementioned mobile initiated and mobile terminated calls between subscriber-1 and subscriber-2 when subscriber 1 is at her premises.

Figure 5:
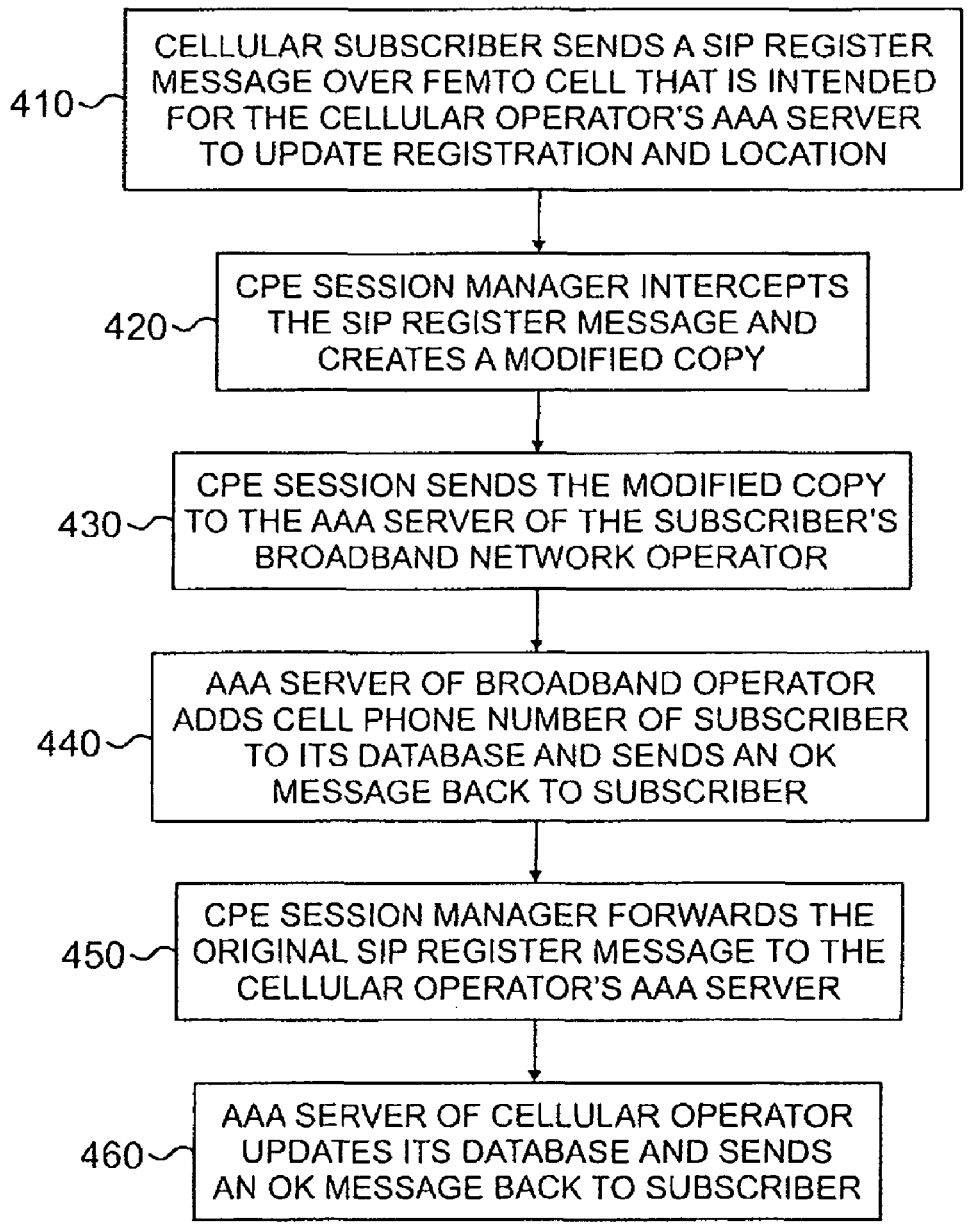
FIG. 5 is a flowchart showing one example of a method by which User Equipment (UE) registers with both the cellular network and the broadband network shown in FIG. 3.

FIG. 5 is a flowchart showing one example of method by which the UE-1 registers with both the cellular network of operator A and the broadband network of operator B in order to access OTT services. First, in step 410, when UE-1 connects with the femto cell at her residence, subscriber-1 sends a REGISTER message from her cell phone to her cellular operator, i.e., operator A, to inform operator A of her new location and point of presence at her residence. Specifically, UE-1 sends a SIP REGISTER message to the AAA server A (which also acts as the SIP Registrar) of the cellular operator A to re-register the cell phone with operator A, indicating that she is home [. The "From" field of this SIP REGISTER message contains an identifier (e.g., a URL) assigned to subscriber-1 by operator A and its "contact" field includes the cell phone telephone URL of subscriber-1, i.e., UE-1. An example of the SIP REGISTER message from the cell phone to the AAA server A of operator A is as follows.

SIP REGISTER message from Cell-phone of subscriber-1 to the AAA server A (i.e., AAA-A):
REGISTER sip:AAA-A. OperatorA.com SIP/2.0
Via: SIP/2.0/UDP ProxyA.OperatorA.com:5060
From: subscriber-1 <sip:subscriber-1@cellphone.OperatorA.com>
To: subscriber1 <sip:subscriber-1@cellphone.OperatorA.com>
Call_ID: 82946@Proxy-A.OperatorA.com
Cseq: 1 REGISTER
Contact: SIP: (Subscriber-1' E.164 cellphone number) @(IP address of the ECONS CPE);user=phone
Content Length: 0

Second, in step 420, the SIP B2BUA session manager of the ECONS CPE intercepts the preceding SIP REGISTER message and creates a modified copy of it to register UE-1 with operator B as well. The SIP B2BUA sends the modified SIP REGISTER message to the AAA server B of broadband IP network B in step 430 to register the cell phone with operator B. The "From" field of this SIP REGISTER message contains an identifier (e.g., a URL) assigned to subscriber-1 by operator B, and its "contact" field includes the cell phone telephone URL of subscriber-1, i.e., UE-1. An example of the SIP REGISTER message from the cell phone to the AAA server B of operator B is as follows.

SIP REGISTER message from Cell-phone of subscriber-1 to the AAA server B (i.e., AAA-B):
REGISTER sip:AAA-B.OperatorB.com SIP/2.0
Via: SIP/2.0/UDP ProxyB.OperatorB.com:5060
From: subscriber-1 <sip:subscriber-1@cellphone.OperatorB.com>
To: subscriber-1 <sip:subscriber-1@cellphone.OperatorB.com>
Call_ID: 82946@Proxy-B.OperatorB.com
Cseq: 1 REGISTER
Contact: SIP: (Subscriber-1' E.164 cellphone number) @(IP address of the ECONS CPE);user=phone
Content Length: 0

Upon reception of this SIP REGISTER message from the cell phone of subscriber-1, in step 440 of FIG. 5, the AAA server B updates its database by adding the cell phone number of the subscriber-1 to its contact list, and sends an OK message back to subscriber-1, an example of which is the following.

200 OK response from the AAA Sever B (i.e., AAA-B) to the cell phone of subscriber-1
SIP/2.0 200 OK
Via: SIP/2.0/UDP ProxyB.OperatorB.com:5060
From: subscriber-1 <sip:subscriber-1@cellphone.OperatorB.com>
To: subscriber-1 <sip:subscriber-1@cellphone.OperatorB.com>
Call_ID: 82946@Proxy.OperatorB.com
Cseq: 1 REGISTER
Contact: SIP: (Subscriber-1' E.164 cellphone number) @(IP address of the ECONS CPE);user=phone
Content Length: 0

Next, upon the reception of the SIP OK message from AAA server B, indicating successful registration with operator B, the SIP B2BUA forwards the original intercepted SIP REGISTER message from UE-1 destined for AAA server of the cellular operator (i.e., AAA server A of operator A) to complete the re-registration of the UE-1 with the cellular operator in step 450. (It should be noted that since UE-1 is attached to the femto cell 322, this SIP REGISTER message cannot directly traverse the macro cell to reach AAA server A. Instead it has to find a way to reach the AAA server A through the femto cell 322 and the ECONS CPE 322.) Upon reception of this SIP REGISTER message from the cell phone of subscriber-1, the AAA server A in step 460 updates its database, and sends an OK message back to subscriber-1, an example of which is the following.

200 OK response from the AAA Sever A (i.e., AAA-A) to the cell phone of subscriber-1
SIP/2.0 200 OK
Via: SIP/2.0/UDP ProxyA.OperatorA.com:5060
From: subscriber-1 <sip:subscriber-1@cellphone.OperatorA.com>
To: subscriber-1 <sip:subscriber-1@cellphone.OperatorA.com>
Call_ID: 82946@Proxy.OperatorA.com
Cseq: 1 REGISTER
Contact: SIP: (Subscriber-1' E.164 cellphone number) @(IP address of the ECONS CPE);user=phone
Content Length: 0

The preceding registration process with operator B enables messages from UE-1 to traverse through the firewall/NAT of operator B, so that the mobile initiated calls of subscriber-1 from her premises to a subscriber on the circuit switched network A will be implemented as an OTT service. This OTT service traverses the route through the femto cell base station 325, ECONS CPE 327, DSL or Cable Modem 329, Broadband IP network B and circuit switched network A.

Similarly, the purpose of re-registration with operator A is to update operator A's knowledge about the presence and location of subscriber-1. This re-registration enables operator A to take advantage of the fact that subscriber-1 is at her premises and routes the mobile terminated calls from subscriber-2's fixed phone (i.e., UE-2) to subscriber-1's cell phone (i.e., UE-1) as an OTT service though the circuit switched network A, broadband IP network B, DSL or Cable Modem 329, ECONS CPE 327 and femto cell base station 325. In principle, this registration process (or, more accurately, re-registration process) with operator A may take place before, after or concurrent with the cell phone's registration with operator B. However, if it takes place after the registration with operator B, the re-registration with operator A will take place as an OTT service.

After the registration of subscriber-1's cell phone with operator B, the SIP message flow of a mobile initiated call from subscriber-1 to subscriber-2's fixed phone on the circuit-switched network A will become similar to the standard procedure for setting up a call from a SIP to a PSTN as specified in Section 2, "SIP to PSTN Dialing", of the IETF RFC 3666. Likewise, the message flow of a mobile terminated call from subscriber-2 on the circuit switched network A to subscriber-1's cell phone at her residence will be similar to the standard procedure specified in Section 3, "PSTN to SIP Dialing", of the IETF RFC 3666.

A couple of points are worth noting. First, when subscriber-1 is at her premises, her cell phone (i.e., UE-1) attaches to the femto cell to establish communication therewith. Upon its registration with the AAA server B (which also acts as the SIP Registrar of operator B as well), operator B becomes aware of the presence of subscriber-1 at her premises and can notify others about her presence in the network upon their subscriptions to the presence server. Second, since subscriber-1 has registered her cell phone with operator B, all inbound sessions and SMS messages directed to the subscriber's VoIP phone will also be routed to her cell phone. In other words, operator B offers an effectively free OTT call-forwarding service to subscriber-1 regardless of whether or not she is home by redirecting all sessions and SMS messages directed to subscriber-1's VoIP phone to her cell phone.

The steps of the processes described above, including but not limited to those shown in FIG. 4, may be implemented in a general, multi-purpose or single purpose processor. Such a processor will execute instructions, either at the assembly, compiled or machine-level, to perform that process. Those instructions can be written by one of ordinary skill in the art following the description provided herein and stored or transmitted on a computer readable medium. The instructions may also be created using source code or any other known computer-aided design tool. A computer readable medium may be any medium capable of carrying those instructions and include a CD-ROM, DVD, magnetic or other optical disc, tape, silicon memory (e.g., removable, non-removable, volatile or non-volatile), and/or packetized or non-packetized wireline or wireless transmission signals.

The invention claimed is:

1. A method of enabling an over the top (OTT) service over a broadband network, comprising:
   receiving a registration request from a mobile User Equipment (UE) over a femto cell to register with a cellular operator of a cellular network;
   forwarding the registration request to an authentication, authorization, and accounting (AAA) server associated with the cellular operator to register the mobile UE therewith; and
   forwarding a rendition of the registration request to an AAA server associated with a broadband operator of a broadband network to register the mobile UE therewith.

2. The method of claim 1 further comprising:
   subsequent to registration with the cellular operator and the broadband operator, receiving a session set-up request from the mobile UE over the femto cell to establish a communication session with a second UE; and
   directing the session set-up request over the broadband network to establish the communication session between the mobile UE and the second UE.

3. The method of claim 1 further comprising:
   subsequent to registration with the cellular operator and the broadband operator, receiving from the broadband network a call from a second UE connected to a circuit-switched network associated with the broadband operator; and
   forwarding the call to the mobile UE over the femto cell.

4. The method of claim 1 wherein the registration request is received and forwarded by a session manager associated with an Edge Convergence Server (ECONS) CPE.

5. The method of claim 1 wherein the registration request is a Session Initiation Protocol (SIP) register message.

6. The method of claim 5 wherein the SIP register message forwarded to the AAA server of the cellular operator includes a first identifier assigned to the mobile UE by the cellular operator.

7. The method of claim 6 wherein the rendition of the SIP register message forwarded to the AAA server of the broadband operator includes a second identifier assigned to the mobile UE by the broadband operator.

8. The method of claim 1 wherein the rendition of the registration request is forwarded to the broadband operator prior to forwarding the registration request to the AAA server of the cellular operator.

9. The method of claim 1 wherein the second UE is connected to a circuit-switched network associated with the broadband operator.

10. The method of claim 5 further comprising creating the rendition of the SIP register message forwarded to the AAA server of the broadband operator by replacing the first identifier in the SIP register message with a second identifier assigned by the broadband operator and replacing an address of the AAA server associated with the cellular network with an address of the AAA server of the broadband network.

11. The method of claim 10 wherein the first identifier is a SIP Universal Resource Locator (URL) assigned by the cellular operator and the second identifier is a SIP URL assigned by the broadband operator.

12. A Consumer Premises Equipment (CPE), comprising:
   a wireless transceiver for establishing communication with a mobile User Equipment) UE over a femto cell;
   a network interface for establishing communication with a cellular network;
   a session manager configured to register the mobile UE with a broadband network operated by a broadband operator whenever a request is received from the mobile UE over a femto cell to register with a cellular network operated by a cellular operator different from the broadband operator.

13. The CPE of claim 12 wherein the session manager is further configured to redirect a communication session initiated by the mobile UE over the femto cell to the broadband network instead of the cellular network.

14. The CPE of claim 12 wherein the session manager is further configured to:
   receive from the broadband network a call from a second UE connected to a circuit-switched network associated with the broadband operator; and
   forward the call to the mobile UE over the femto cell.

15. The CPE of claim 14 wherein the session manager is a Session Initiation Protocol (SIP) back to back user agent (B2BUA).

16. The CPE of claim 15 wherein the session manager is configured to register the mobile UE with the broadband network by creating a rendition of the registration request by (i) replacing a first identifier of the mobile UE assigned by the cellular operator with a second identifier of the mobile UE assigned by the broadband operator and (ii) replacing a first address of an authentication, authorization, and accounting (AAA) server associated with the cellular network with a second address of an AAA server of the broadband network.

17. The CPE of claim 12 wherein the network interface includes a broadband modem for establishing communication with the broadband network.

18. A non-transitory computer readable medium containing instructions to cause a processor to perform a method of presenting information associated with a packet-switched telephony call received over a broadband communications network, the method comprising:
   receiving a registration request from a mobile User Equipment (UE) over a femto cell to register with a cellular operator of a cellular network;
   creating a rendition of the registration request by (i) replacing a first identifier of the mobile UE assigned by the cellular operator with a second identifier of the mobile UE assigned by a broadband operator of a broadband network and (ii) replacing a first address of an authentication, authorization, and accounting (AAA) server associated with the cellular network with a second address of an AAA server of the broadband network; and
   causing the rendition of the registration request to be forwarded to the AAA server associated with the broadband operator to register the mobile UE therewith.

19. A non-transitory computer readable medium of claim 18 further comprising causing the registration request to be forwarded to the AAA server associated with the cellular operator to register the mobile UE therewith.

20. A non-transitory computer readable medium of claim 18 further comprising:
   receiving an indication that a call has been received over the broadband network from a second UE connected to a circuit-switched network associated with the broadband operator; and
   causing the call to be forwarded to the mobile UE over the femto cell.

* * * * *